Figure 1A:
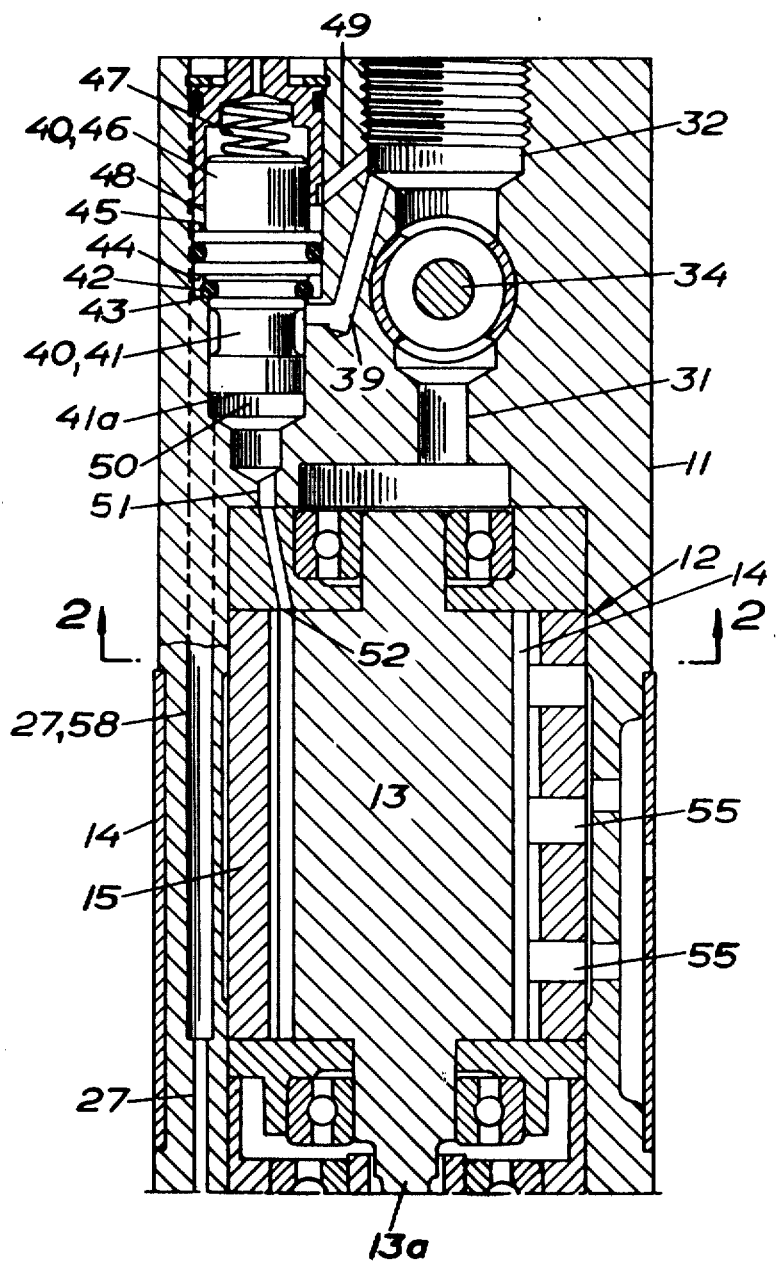

United States Patent

[11] 3,610,343

| [72] | Inventor | Sven Ake Bratt<br>Trollbacken, Sweden |
|---|---|---|
| [21] | Appl. No. | 851,660 |
| [22] | Filed | Aug. 20, 1969 |
| [45] | Patented | Oct. 5, 1971 |
| [73] | Assignee | Atlas Copco Aktiebolag<br>Nacka, Sweden |
| [32] | Priority | Sept. 10, 1968 |
| [33] | | Sweden |
| [31] | | 12125/68 |

[54] NUT RUNNER HAVING TORQUE RESPONSIVE GEARSHIFT
16 Claims, 6 Drawing Figs.

[52] U.S. Cl. ............................................... 173/12,
81/57.14
[51] Int. Cl. ....................................................... B25b 23/14

[50] Field of Search............................................. 173/12;
81/57.14; 74/861

[56] References Cited
UNITED STATES PATENTS

| 2,924,114 | 2/1960 | Hitt et al. ....................... | 74/861 |
| 3,257,877 | 6/1966 | Ulrich et al. ................... | 81/57.14 X |

*Primary Examiner*—Ernest R. Purser
*Attorney*—Bauer & Goodman

ABSTRACT: A nut runner has a compressed air driven motor and a two-speed gear mechanism. The gear mechanism shifts automatically to the lower speed when, at the end of a running down period, the resistance to rotation becomes greater. The shift is initiated when a predetermined rise in pressure in the motor is reached.

INVENTOR.
SVEN A. BRATT
BY Bauer & Goodman

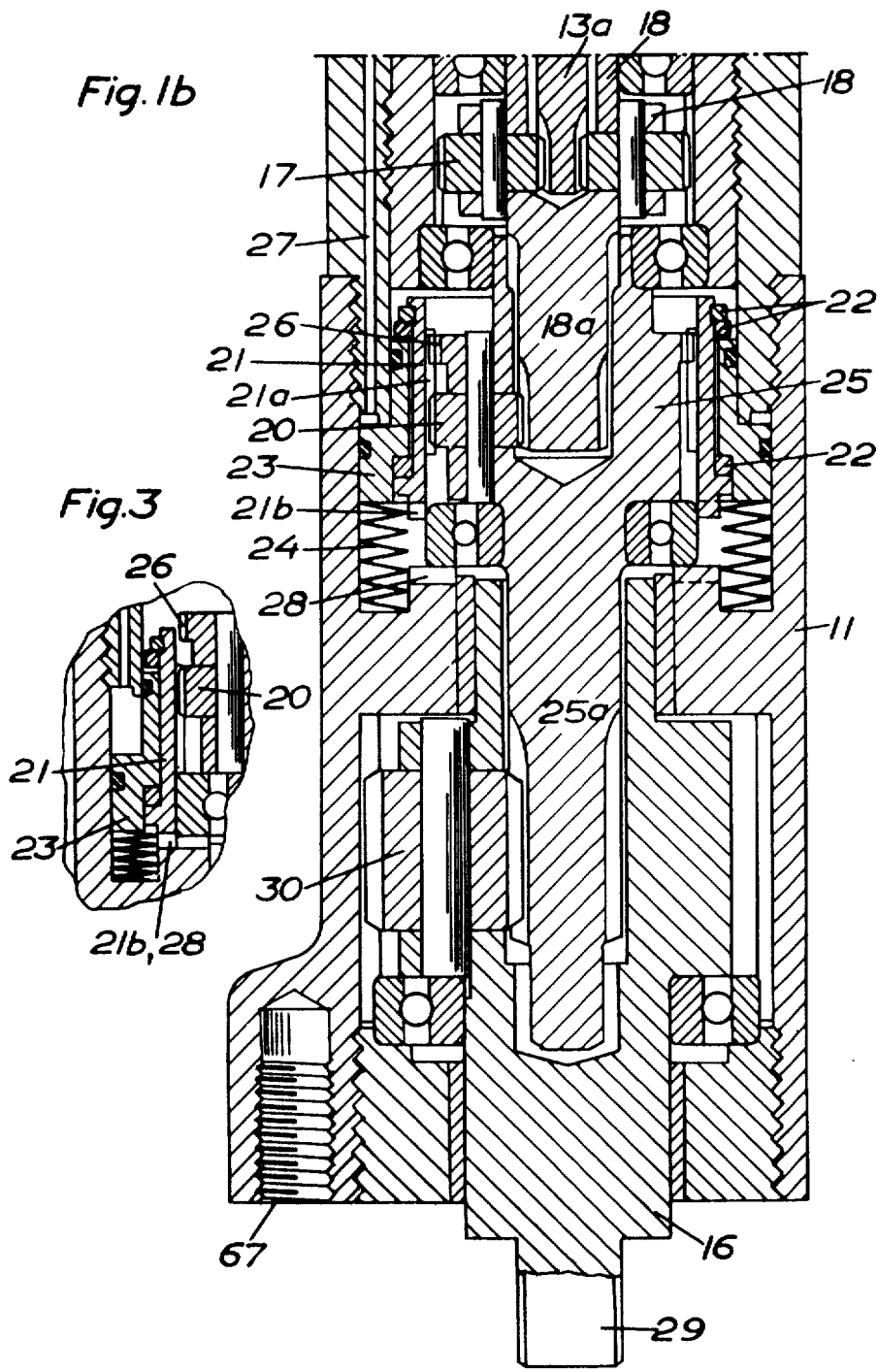

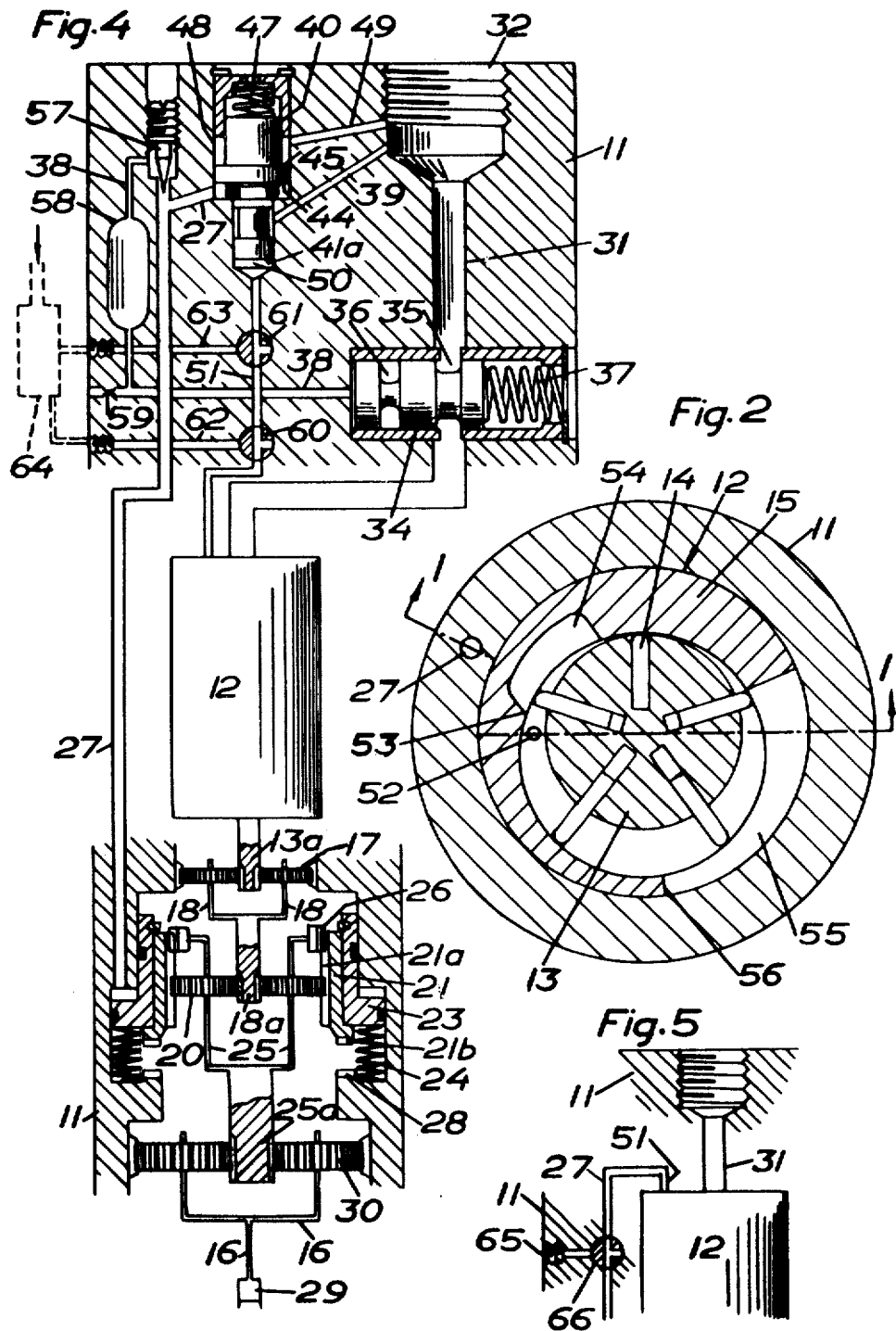

NUT RUNNER HAVING TORQUE RESPONSIVE GEARSHIFT

This invention relates to nonimpacting nut runners, screwdrivers or like tools of the type having a working spindle driven by a pressure fluid actuated motor via an automatically shifting two-speed reduction gear mechanism. Such a nut runner will create higher torque during the final torquing than during the running down because of a greater speed reduction during final torquing. In connection with prior embodiments of such nut runners, there is used a slipping clutch which, when overloaded, slips or ratches. Then, an one-way clutch takes up the drive at a greater speed reduction and, thus, a lower speed but a higher torque results. This will create noise and vibration and excessive wear of the clutch members. In order to avoid these disadvantages, in connection with small hand-held nut runners, a clutch element, which is loaded by the torque and at a specific torque load is caused to shift position so as to interconnect an additional set of gears, has been suggested. Friction and wear is hazardous to this function. Therefore, this type may be used only in connection with hand-held nut runners having a low maximum torque.

It is, therefore, an object of the invention to eliminate these disadvantages and provide a long lasting and durable nut runner which is suitable for creating and transmitting high torque load, is subject to a negligible wear, and is functionally reliable. Furthermore, the invention permits in a simple way an opportunity for external manually or sequentially controlled initiating of the shifting into high-force/low-speed operation.

For these and other purposes there is provided a nut runner or like tool having a housing, a working spindle, a pressure fluid driven motor for driving said working spindle, inlet and outlet ports in said motor, a fluid supply passage in said housing for connecting said inlet port to a pressure fluid conduit, a two-speed reduction gear mechanism interconnected between the motor and the working spindle, and a pressure fluid circuit for sensing the drive fluid pressure at a sensing point upstream of said outlet port and arranged for initiating shifting of the gear mechanism from operating with a lower reduction ratio to operating with a higher reduction ratio when a predetermined rise in pressure is attained at said sensing point.

The above and other objects of the invention are obvious from the following description and from the accompanying drawings in which two nut runners according to the invention are described by way of example. It should be understood that these embodiments are only illustrative to the invention.

In the drawings, FIGS. 1a and 1b are intended to be seen together. FIG. 1a is a longitudinal section substantially on line 1—1 in FIG. 2 through the back portion of an embodiment of a nut runner according to the invention, and FIG. 1b is a longitudinal section through the corresponding forward portion. FIG. 2 is a transverse section on line 2—2 in FIG. 1a. FIG. 3 is a section of a clutching member, illustrated in FIG. 1, in an alternative position of engagement. FIG. 4 is a diagrammatic longitudinal section of the nut runner of FIGS. 1a and 1b. FIG. 5 illustrates diagrammatically a part of another embodiment according to the invention.

The nut runner of the FIGS. 1–4 has an outer housing 11 in which a pneumatically driven sliding vane motor 12 with a rotor 13 is arranged to drive a working spindle 16 via reduction gearings as will be described. The spindle 16 has a squared drive shank 29 to which, for example, a wrench sleeve, not shown, may be attached. The rotor 13 carries radial driving vanes 14 which sealingly rotate in a working cylinder 15. The cylinder 15 has air inlet ports 54 and air outlet ports 55. A stub shaft 13a, integral with the rotor 13, provides a sun gear meshing with planet gears 17 and, thus, there will be a speed reduction between the rotor 13 and carrier 18 of the planet gears 17. The forward end of the carrier 18 provides a shaft or sun gear 18a which drives planet gears 20 of a second set of planetary gears. These planet gears 20 mesh constantly with integral elongated teeth 21a of a circular clutching ring 21, which is fixed axially to an annular piston element 23 by means of sliding and retaining rings 22. The piston element is not rotatable but the sliding rings 22 permit rotation of the clutching ring 21.

Springs 24 are arranged to press the piston element 23 and, thus, the clutching ring 21 upwards in FIG. 1b, so that the elongated ring gear provided by the teeth 21a normally meshes with teeth 26 of a carrier 25 of the planet gears 20 as illustrated in the figure. The forward portion of the carrier 25 is in the form of a shaft which serves as a sun gear 25a and with the clutching ring 21 in the position described, the teeth 21a thus lock the planet gears 20 with respect to the carrier 25 so that the set 18a, 20, 21, 25 of planetary gears transmits torque without reducing the speed; i.e. the shafts 18a and 25a will rotate conjointly.

Via a passage 27, the piston element 23 can be actuated by compressed air to take up an alternative position, illustrated in FIG. 3, so that the teeth 21a of the clutching ring 21 do not mesh with the teeth 26 of the carrier 25. Forward directed dogs 21b of the clutching ring 21 now mesh with internal dogs 28 of the housing 11, and, consequently, the clutching ring 21 cannot be rotated. With the clutching ring in this position, there will, therefore, be a speed reduction via the planet gears 20, and, thus, the shaft 25a will have a lower speed than the shaft 18a.

The working spindle 16 of the nut runner serves as a carrier of planet gears 30, to which the housing 11 provides a fixed ring gear so that there will constantly be a speed reduction via the planet gears 30.

Drive air is supplied to the motor 12 via a hose, a fitting (not shown) screwed into a bore 32 and a supply passage 31 in the rear end of the housing 11. A shutoff valve, in the form of a valving spool 34 with two annular recesses 35, 36, is disposed crosswise in the supply passage 31. The spool 34 has one end face biased by a spring 37; the other end face can be acted upon by compressed air through a pilot passage 38.

A passage 39 leads from the bore 32 to the passage 27 via a pilot valve having a valving body 40, FIG. 4, 1a. The valving body 40 comprises: a forward portion 41 which by means of a seat-packing 42 can seal against a seat 43; an intermediate portion with two piston surfaces 44, 45 providing a differential piston; and a backhead 46 acted upon by a spring 47. In the figures, the pilot valve 40 is shown in its closed position. The differential piston 44, 45 separates an intermediate chamber 48 to which a passage 49 leads from the bore 32. The forward portion 41 of the pilot valve 40 has a face 41a which separates an end chamber 50 connected by means of a pilot passage 51 to an orifice 52 in the working cylinder 15. In FIG. 4, there are shown two three-way valves 60, 61 disposed in the pilot passage 51, and passages 62, 63 associated therewith. The orifice 52 is preferably disposed in the sector of the working cylinder 15 which is bounded by the closing edges 53 of the air inlet ports 54 and half the angular distance to the opening edges 56 of the air outlet ports 55 of the sliding vane motor 12, FIG. 2. With the three-way valves 60, 61 in their normal positions as shown in FIG. 4, the pressure in the working cylinder 15 is transmitted to the forward face 41a of the valving body 40 by means of the orifice 52 and the passage 51.

The passage 38 is vented to the atmosphere through a restriction 59 and the passage 27 is vented through an adjustable restriction valve 57 to the pilot passage 38 which is of large volume by including a recipient 58.

Normally, a single pressure regulator (not shown) and a single manually operable throttle valve (not shown) serve a number of nut runners which are fastened to a common mounting plate by means of screws screwed into threaded bores 67.

For the purpose of running a nut, the operator inserts the squared shank 29 into a wrench sleeve, not shown, which has been placed around the nut. Then he adjusts the drive pressure regulator to provide a drive pressure which, at stalling, will give the desired final torque. Finally, he pressurizes the air supply passage 31. By virtue of the spring 37, the shutoff valve 34 is in its open position as in FIG. 4 and the rotor 13, therefore, begins to rotate and turn the squared shank 29. The pilot valve 40 is in its closed position (also shown in FIG. 4) due to the action of the spring 47 and of pressurized air acting on the piston surface 45. The passage 27 is, therefore, not pressurized and the springs 24 hold the piston element 23 and the clutching ring 21 in the position above described and shown in the FIGS. 1a and 4 and, thus, there is no speed reduction via the set 18a, 20, 21, 25 of planetary gears. At the beginning of the operation, i.e. the running down, the rotational resistance is small, the rotor 13 rotates rapidly and the pressure at the orifice 52, which is disposed in the expansion zone of the working air, will be relatively low. With increasing resistance to rotation, the speed of the rotor 13 and the air consumption successively decrease. The reduction of the airflow results in a reduction of the pressure losses in the inlet ports 54 and in the air supply passage 31. Therefore there is a rise in pressure at the air inlet ports 54 as well as at the orifice 52 and in the end chamber 50. With the decreasing number of revolutions, to an increased extent, the expansion is counteracted by air leaking past the vanes. This will give an additional pressure rise at the orifice 52. According to the invention, it is possible to sense the rise of pressure at 54 or 31 upstream of the motor, but the sensing at 52, as illustrated is preferable since the pressure rise is greater there.

When a specific pressure rise, predetermined by the design of the pilot valve, is reached in the end chamber 50, the pilot valve 40 is forced to open so that compressed air flows through the passages 39 and 27 and urges the piston element 23 and, thus, also the clutching ring 21 to shift into the positions illustrated in FIG. 3 and described above. With the clutching ring 21 in this position, there is a speed reduction via that planet gears 20 which results in a greater total speed reduction.

When open, the pilot valve 40 remains open due to pressurized air acting upon the piston surface 44; also, if the pressure in the end chamber 50 were to be reduced. Thus, there will be no risk of the dogs 21b, 28 becoming disengaged. The spring 47 is essential for obtaining positive closing of the valve 40 before the drive air is on but it may be a weak spring. Due to the fact that, during running, the pilot valve 40 is urged to the closed position in the main by pressurized air acting upon a piston surface 45, the pressure rise in the pilot passage 51 needed for opening the valve will be substantially proportional to the pressure of the drive air. This is advantageous because the spring 47 need not be adjustable.

When the pilot valve 40 opens for causing the additional planetary set of gears to take up the working position, pressurized air will be provided from the passage 27 to the passage 38 via the restriction valve 57.

Therefore, with reference to FIG. 4, the shutoff valve 34 will take up its position at right, not illustrated, with the recess 36 maintaining the supply passage 31 open. When shifting position, the valve will shut off this supply passage 31 during a short interval. As a result, the torque is reduced during this interval so that interengagement between the dogs 21b–28 will take place at reduced torque which will minimize the wear. Moreover, the dogs will not fail to interengage even in connection with rigid joints, in which the torque resistance may increase so suddenly that the increasing friction power obstructs disengaging of teeth 21a, 26.

To prevent too rapid a rise in pressure in the passage 38 which would would urge the shutoff valve to shift before the piston element 23 is urged to shift by the action of compressed air in the passage 27, the channel 38 has got its large volume and adjustable restriction valve 58.

The desired final torque is reached when the motor 12, 13 stalls under pressure. The air supply to the passage 31 may now be shut off so that the passage 27 is vented through the restrictions valves 57 and 59. Then, the springs 24 will reset the clutching ring 21 to the position illustrated in FIGS. 1b and 4, and the springs 47 and 37 will reset the pilot valve 40 and the shutoff valve 34 to the positions illustrated in FIG. 4.

If manually initiated disengaging of the clutch provided by the teeth 21a, 26 and engaging of the clutch provided by the dogs 21b, 28 are desired, the three-way valve 60 is turned 90° counterclockwise from the position illustrated in FIG. 4. Shifting of the gear mechanism may now be effected by a pressure pulse in the passage 62.

If a number of nut runners are connected in parallel, it is often desirable that the final torquing be simultaneous or in a predetermined sequence. To accomplish this, there is used a control device 64, illustrated in FIG. 4 by dashed lines, to which the channels 62, 63 of several nut runners are connected. In this case the three-way valve 60 is turned 90° clockwise from the position in FIG. 4 and the three-way valve 61, 90° counterclockwise. The rise in pressure from each orifice 52 is registered in the control device 64, which actuates the piston elements 23 in a desired sequence by means of pressure pulses in the passages 63.

In FIG. 5 there is illustrated a simplified backhead of a nut runner, which for the rest conforms to that of FIG. 4. The same reference numerals have been given to corresponding details. This embodiment differs from that above described principally in that it has neither shutoff valve 34 nor a pilot valve 40 but the pilot passage 51 is directly connected to the passage 27. In this case the clutch dogs 21b, 28 are designed so as to remain interengaged as long as they are being loaded with any torque, since the pressure in the passage 27 may be reduced when the dogs have become interengaged.

A three-way valve 66 is arranged so as to permit shifting of gears alternatively by direct external pressure fluid acting upon the piston element 23 through a fitting 65.

The invention is not limited to the embodiments illustrated, but may be varied within the scope of the following claims.

1. A nut runner or like tool having a housing, a working spindle, a pressure fluid driven motor for driving said working spindle, inlet and outlet ports in said motor, a fluid supply passage in said housing for connecting said inlet port to a pressure fluid conduit, a two-speed reduction gear mechanism interconnected between the motor and the working spindle, and a pressure fluid circuit for sensing the drive fluid pressure at a sensing point upstream of said outlet port and arranged for initiating and causing shifting of the gear mechanism from operating with a lower reduction ratio to operating with a higher reduction ratio when a predetermined rise in pressure is attained at said sensing point, and a pressure fluid actuated piston for effecting said shifting of said gear mechanism, said gear mechanism including at least one set of planetary gears constantly interconnected between said motor and said working spindle for reducing the speed of the latter, and an additional set of planetary gears comprising a driven sun wheel, a driving planet carrier, planet gears, and a ring gear, said ring gear having a first position in which it is rotatable and locks said planet carrier and planet gears against relative rotation, and a second position in which it is locked against rotation and permits the planet gears to rotate with respect to the planet carrier, said pressure fluid actuated piston being arranged for shifting said ring gear from said first position to said second position.

2. A tool according to claim 1 in which the piston element is of annular form and disposed around the ring gear, which is axially fixed to the piston element but rotatable relative thereto, said piston element being spring biased towards a position in which it holds the ring gear in said first position.

3. A tool according to claim 1 in which the motor is a sliding vane motor and the pressure fluid circuit is connected to an orifice in the working cylinder of the motor for sensing the drive pressure therein acting directly on the vanes.

4. A tool according to claim 3 in which the orifice is disposed within the sector of the working cylinder bounded by the closing edge of the air inlet port and half the angular distance to the opening edge of the air outlet.

5. A tool according to claim 1 in which said pressure fluid circuit includes a direct connection between the sensing point and the piston.

6. A tool according to claim 5 in which a valve is provided effective to close said direct connection between the sensing point and the piston and simultaneously connect a passage from an external fluid supply to the piston.

7. A tool according to claim 1 in which a shutoff valve is arranged to shut off said supply passage for a short interval during the shifting of the gear mechanism.

8. A tool according to claim 1 in which the motor is a sliding vane motor and the pressure fluid circuit is connected to an orifice in the working cylinder of the motor for sensing the drive pressure therein acting directly on the vanes.

9. A nut runner or like tool having a housing, a working spindle, a pressure fluid driven motor for driving said working spindle, inlet and outlet ports in said motor, a fluid supply passage in said housing for connecting said inlet port to a pressure fluid conduit, a two-speed reduction gear mechanism interconnected between the motor and the working spindle, and a pressure fluid circuit for sensing the drive fluid pressure at a sensing point upstream of said outlet port and having control means arranged therein for causing shifting of the gear mechanism from operating with a lower reduction ratio to operating with a higher reduction ratio when a predetermined rise in pressure is attained at said sensing point, and a pressure fluid actuated piston in said circuit for effecting said shifting of the gear mechanism, said control means comprising a pilot valve having a valving body, a passage for supplying fluid from the fluid supply passage to said pilot valve, an actuating passage from the pilot valve to the piston, and a sensing passage from said sensing point to the pilot valve for fluid actuated controlling of the pilot valve, said pilot valve having an open position for permitting flow from said passage between the fluid supply passage and the pilot valve to said actuating passage, and a closed position.

10. A tool according to claim 9 in which the valving body of the pilot valve is continuously biased towards its closed position and arranged to be urged towards its open position by the fluid in said sensing passage acting on a first piston surface of the valving body and also by the fluid in said actuating passage acting on a second piston surface of the valving body.

11. A tool according to claim 10 in which the valving body is constantly biased towards closed position by means of a spring and by drive pressure fluid acting on a third piston surface of the valving body.

12. A tool according to claim 7 in which a shutoff valve is arranged to shut off the supply passage for supplying fluid to the motor during a short interval in connection with shifting of the gear mechanism.

13. A tool according to claim 12 in which said shutoff valve comprises a valving spool disposed crosswise through the supply passage for supplying fluid to the motor, said valving spool having two positions in which the supply connection is held open, and one position between the open positions in which the supply connection is shut off, the valving spool being continuously biased towards one of the open positions and provided for being urged to the other open position by the action of pressure fluid from said actuating passage acting on a piston surface of the valving spool when said actuating passage is pressurized.

14. A nut runner or like tool having a housing, a working spindle, a pressure fluid driven motor for driving said working spindle, inlet and outlet ports in said motor, a source of pressure fluid, a fluid supply connection in said housing for normally supplying pressure fluid from said source to said motor inlet port, a two-speed reduction gear mechanism interconnected between the motor and the working spindle, means operated by pressure fluid diverted from said motor inlet port for shifting the gear mechanism from operating with one reduction ratio to operating with another reduction ratio, and a shutoff valve arranged to completely shut off said pressure fluid supply from said motor inlet port during a short interval during which said gear mechanism is shifted.

15. A tool according to claim 14 in which said shutoff valve comprises a valving spool disposed crosswise through the supply connection for supplying fluid to the motor, said valving spool having two positions in which said supply connection is held open, and a position intermediate said open positions in which said supply connection is shut off, the valving spool being continuously biased towards one of the open positions and arranged to also be urged to the other momentarily via said intermediate position by the action of pressure fluid acting on the valving spool.

16. A tool according to claim 15 in which an adjustable means is provided upstream of said piston surface of said valving spool for timing the actuation thereof in relation to the actuation of said valving spool.